United States Patent [19]
Bedell et al.

[11] Patent Number: 4,649,254
[45] Date of Patent: Mar. 10, 1987

[54] AMORPHOUS METAL RIBBON FABRICATION

[75] Inventors: John R. Bedell, Madison, N.J.; Eli Rosenthal, Brooklyn, N.Y.

[73] Assignee: Electric Power Research Institute, Palo Alto, Calif.

[21] Appl. No.: 734,553

[22] Filed: May 16, 1985

[51] Int. Cl.$^4$ .............................................. B23K 26/00
[52] U.S. Cl. .................. 219/121 LD; 219/121 LF; 219/121 LS
[58] Field of Search ................. 219/121 LC, 121 LD, 219/121 EL, 121 ED, 121 LS, 121 LT, 121 LE, 121 LF

[56] References Cited

U.S. PATENT DOCUMENTS

| | | | |
|---|---|---|---|
| 3,974,016 | 8/1976 | Bondybey et al. | 219/121 LM |
| 4,115,682 | 9/1978 | Kavesh et al. | 219/118 |
| 4,185,185 | 1/1980 | Adlam | 219/121 L |
| 4,187,408 | 2/1980 | Heile | 219/121 L |
| 4,471,204 | 9/1984 | Takafuji et al. | 219/121 LC |

Primary Examiner—C. L. Albritton
Attorney, Agent, or Firm—King & Schickli

[57] ABSTRACT

A method is disclosed for the welding of two or more glassy metallic ribbons into a monolithic or composite glassy metallic body. The method includes the step of drawing the ribbons in converging fashion through a nip between two high speed rotating rollers. A heat source is generated with a series of laser beams focused at spaced intervals along the nip between the converging and contacting ribbon surfaces prior to compressing the ribbons together. The welded body is internally cooled at a rate sufficient to retain the ribbons and the weld zone therebetween in a glassy metallic state following welding. The parameters of temperature, ribbon speed, exposure time, laser beam power and ribbon thickness for the process are disclosed. In the preferred embodiment, full width welding in a narrow rectangular area adjacent the line of convergence is generated to provide a monolithic body; whereas, in an alternative embodiment strip/spot welding is provided between the ribbons.

10 Claims, 4 Drawing Figures

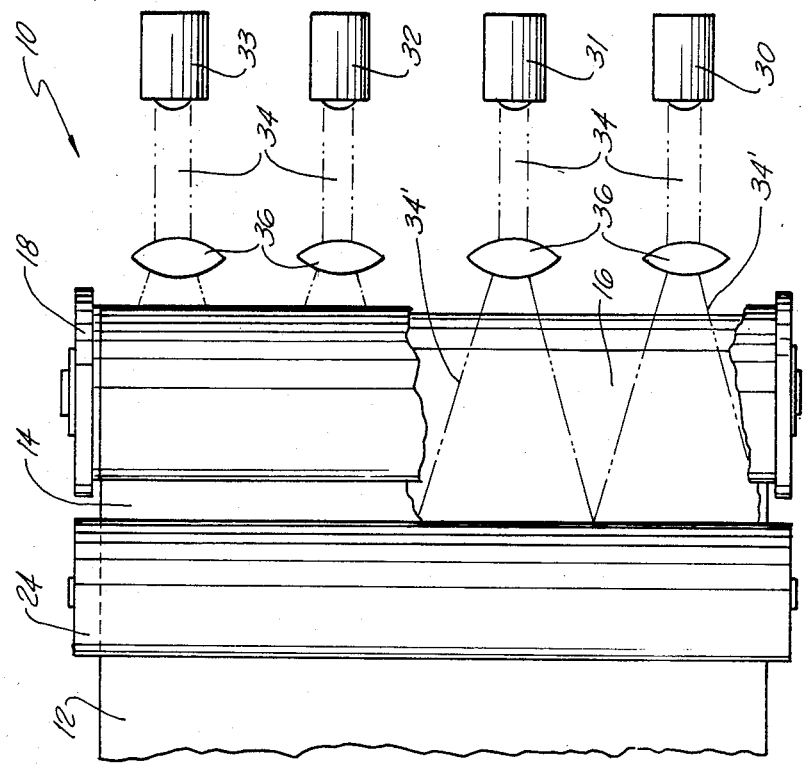
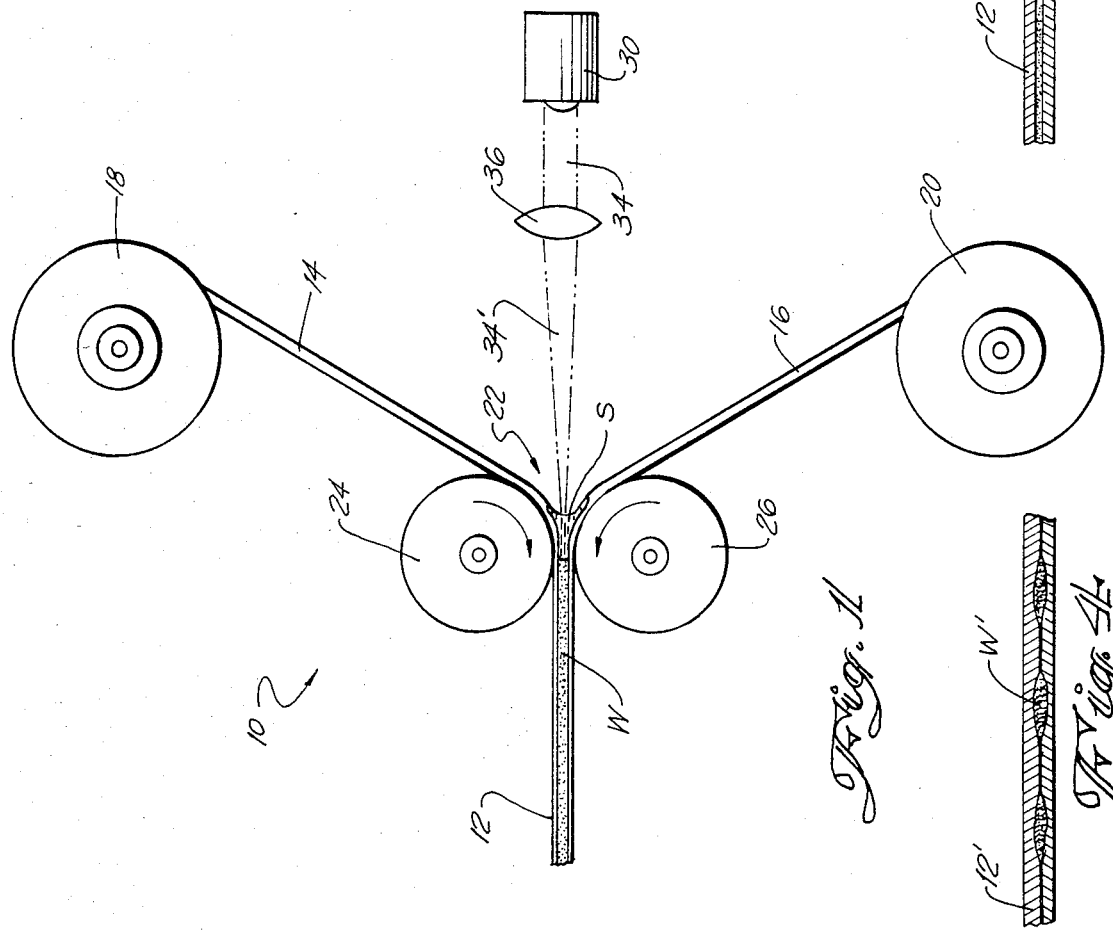

AMORPHOUS METAL RIBBON FABRICATION

TECHNICAL FIELD

This invention relates generally to the welding of two or more amorphous metallic ribbons into a thicker ribbon, in particular, to a method of continuous welding of amorphous metallic ribbons and maintaining the weld zone therebetween in an amorphous state following welding.

BACKGROUND OF THE INVENTION

A cast product having an amorphous or glassy molecular structure, in the form of a relatively thin elongated strip or ribbon, has proven to be effective for winding into highly efficient cores for electrical transformers of other uses. Some of the most recent developments in the casting of amorphous or glassy metal ribbons are reviewed in U.S. Pat. No. 4,332,848.

As is known the casting of ribbons having an amorphous or glassy structure requires the application of a particularly high chill rate to the ribbon on the order of $10^5$–$10^{6°}$ C./sec. Further, this chill rate must be provided throughout the entire thickness of the ribbon if a continuous glassy structure is to be obtained. Consequently, the thickness of amorphous cast ribbons is limited by these extreme heat transfer requirements. If proper heat transfer is not maintained some crystallization occurs, thus destroying the amorphous structure.

While these thin cast glassy ribbons may be wound into highly efficient transformer cores, increased stacking or packing densities are possible with thicker ribbons in order to further increase the efficiency of the transformer, and generally to lower the cost. These advantages are deemed to make it worthwhile to seek a way to sucessfully make thicker amorphous metal ribbon.

U.S. Pat. No. 4,185,185 to Adlam and U.S. Pat. No. 4,187,408 to Heile disclose a continuous seam welding process for binding two strips of sheet material such as aluminum, that converge at a V between two nip rolls. The nip rolls apply pressure at the point of convergence and a laser beam is focused into the converging V.

The Adlam and Heile patents do not teach or suggest a method for the fabrication of thick glassy metallic ribbons from two or more glassy metallic ribbons. In other words, the prior art fails to recognize or consider how to deal with the peculiar properties of amorphous or glassy material when forming a thick ribbon. There is no teaching or suggestion of special treatment and parameters of operation during welding if the glassy structure is to be retained through the entire body of the ribbon.

In order to weld glassy metallic ribbons together so that the resulting product is a single glassy metallic body, the nature of the heat transfer characteristics of the system and the properties of the glassy material must be considered. If the integrity of the amorphous molecular structure of the material is to be maintained, the crystallization temperature of the material must not be exceeded. Also, because of the slow heat transfer rates that may be expected between the ribbon and the external environment, the ribbon has to be self-quenching or cooling. Additionally, with heat from the ribbon surface during welding rapidly dispersing into the ribbon body, the ribbon must be moving at a rapid rate so that the molten surfaces forming the weld zone can come into contact before they re-solidify. Therefore, the welding together of two strips of amorphous metal ribbon so that the product remains amorphous may only take place within certain parameters, relating to the welding energy, drawing rate and cooling rate.

DISCLOSURE OF THE INVENTION

Accordingly, it is a primary object of the present invention to provide a method for the fabrication of thick amorphous or glassy metallic ribbons and other structures.

A more specific object of the present invention is to provide a method for the welding of two or more glassy metallic ribbons into a single glassy metallic body.

Another object of the present invention is to provide a method for applying a high radiation flux energy to two glassy metallic ribbons being welded into a single glassy metallic body with a rapid drawing rate of the ribbons to allow resolification without crystallization.

Still another object of the present invention is to fabricate thick glassy metallic ribbons for increased stacking or packing density as, for example, when wound into a transformer core. The increased packing density allows an increased voltage to be induced on the winding thereby, advantageously providing transformer efficiency.

A further object of the present invention is to provide for the fabrication of other monolithic glassy metallic bodies, such as plates or pipes.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a method for the continuous fabrication or welding together of two or more amorphous or glassy metallic ribbons into a single glassy metallic body is provided. The method includes the step of drawing the ribbons in converging fashion into firm contact with each other at a nip between two moving substrates. A high intensity source of heat is focused substantially at the center line of the nip between the converging and contacting ribbon surfaces. The heat source serves to form a welding zone on the surface of each of the converging and contacting ribbons. The total energy absorbed by the ribbons is limited such that when the energy is distributed evenly throughout the resulting monolithic body, the temperature of the body does not exceed the crystallization temperature of the ribbons. The amorphous structure of the ribbons is thereby maintained.

The remaining steps of the method include compressing the ribbons at the nip between the substrates to form the ribbons into a monolithic body and self-cooling the body internally at a rate sufficient to resolidify the ribbons and retain the weld zones therebetween in a glassy metallic state following the welding. As indicated above, the self-cooling step is necessary if a suffient heat transfer rate is to be provided, resulting in a thick ribbon product with an amorphous or glassy structure.

The method may also include the additional step of generating the high intensity source of heat with at least one laser beam. The laser beam is directed into the nip so that it is focused along the line of convergence of the two ribbons being welded together. In this manner, the energy from the laser beam impinges upon each ribbon in a very narrow rectangular area adjacent to the line of convergence of the two ribbons. Since the two ribbons are converging, the impinging radiation undergoes many reflections in this area and is therefore almost totally absorbed. As will be discussed in detail below, the welding energy or power required for the welding process is a function of the particular amorphous material being welded, as well as the drawing and self-cooling rates of the ribbons.

Preferably, the high intensity source of heat is generated by the focusing of a plurality of laser beams at spaced intervals covering the entire line along the nip between the converging and contacting ribbon surfaces. The intervals are of sufficient distance so that a higher radiation flux may enter the ribbons at each area of focus. Advantageously, this allows the drawing rate of the ribbons to be maintained at the rapid speed required for bringing the weld zones of the two ribbons into contact before resolidification. The drawing rate of the ribbons is determined to be at a rate of at least 1,479 cm/sec and the heat projection rate is approximately 9.15 kilowatts/centimeter of ribbon width. In a further aspect of the invention, in accordance with its objects and purposes, a thick amorphous glassy metallic ribbon is provided as produced from the method set forth above. Advantageously, such a thick glassy metallic ribbon may be produced of a greater thickness than possible through the casting process alone due to limitations resulting from the heat transfer requirements necessary to promote formation of the glassy structure. The thick glassy metallic ribbon product advantageously provides increased stacking or packing densities. When wound into a transformer core, the increased stacking density of the thick ribbon weld product increases the voltage that may be induced on the winding, thereby increasing transformer efficiency.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing:

FIG. 1 is a schematical representation of a laser welding apparatus for performing the method steps in producing the product of the present invention;

FIG. 2 is a cutaway top plan view of the laser beam welding apparatus of FIG. 1 wherein a pluarlity of laser beams are focused at spaced intervals with the energy spread along the nip between the converging and contacting ribbon surfaces;

FIG. 3 is a partial lateral cross-sectional view of welded monolithic glassy body made in accordance with the method of the present invention; and FIG. 4 is a partial lateral cross-sectional view of an alternative glassy body made from laterally spaced energy beams.

Reference will now be made in detail to the present preferred embodiment of the invention, an example of which is illustrated in the accompanying drawing.

BEST MODE OF CARRYING OUT THE INVENTION

Reference is now made to FIGS. 1 and 2 showing a laser beam welding apparatus 10 for performing the method of and producing the monolithic glassy metallic body or ribbon 12 of the present invention. Two glassy metallic ribbons 14, 16 are drawn from supply reels 18, 20, respectively, so as to converge and firmly contact one another at a nip 22 formed between pressure rollers 24, 26.

The ribbons 14, 16 may be drawn through the pressure rollers 24, 26 from a point downstream of the rollers, fed from a point upstream or alternatively by driving the pressure rollers themselves. The drawing rate of the ribbons 14, 16 through the pressure rollers 24, 26 depends upon the particular ribbon material and the radiation flux being applied thereto, as discussed in detail below. The drawing rate should, however, be sufficiently rapid to assure that the molten surfaces of the ribbons 14, 16 contact each other before they resolidify to form weldment W. The molten metal along the surfaces flow into any minor valleys, recesses on thin spots on the converged ribbons 14, 16 and immediately freezes as the heat is conducted to the relatively cold encompassing ribbon mass. Tests have shown typical drawing rates to be at least on the order of 1,479 cm/sec.

A high intensity source of heat is provided by means of lasers 30–33, each generating a beam 34'. As shown in FIG. 2, the laser beams 34 are projected by lenses 36 at spaced intervals and spread into focused beams 34 along the nip 22 between the converging and contacting ribbon surfaces 14, 16. A plurality of focused beams 34' are preferred since a much higher radiation flux can enter the ribbon at each point of focus, thereby allowing the rapid drawing rate of the ribbons to be maintained.

As an alternative, spaced laser beams are used and focused at intervals along the line of convergence across the width of the ribbons 14, 16. This alternative allows the production of a thick ribbon with only intermittent welds (as shown in FIG. 4) for the production of transformer cores exhibiting other improved qualities, as will be seen later in further detail.

The energy of laser beams 34 is reflected toward the nip 22 by the converging ribbons 14, 16 and completely absorbed to provide molten ribbon surfaces S upstream of rollers 24, 26. As ribbons 14, 16 are drawn through the nip 22 the pressure rollers 24, 25 provide the compressive force necessary to join the molten surfaces S of ribbons 14, 16 together and form a bond upon resolidification of weld zone W of thick product ribbon 12 (see FIG. 1).

As indicated above, amorphous or glassy materials possess unique electrical conducting and other properties that require special treatment if those properties are to be retained following processing. In particular, the method of the present invention must be performed within certain operational parameters of welding energy or laser beam power and drawing rate so as to provide sufficient self-cooling of the product ribbon to retain the amorphous structure.

There are three initial points that must be made with regard to the proposed method due to the nature of the heat transfer characteristics of the system and the properties of the amorphous materials. Firstly, because of the slow heat transfer rates that may be expected between the ribbon and its external environment, the ribbon must be self-cooling. Secondly, to assure maintaining the ribbon 12 in an amorphous or glassy state the maximum energy that may be absorbed by the ribbon, when finally distributed evenly, must leave the ribbon temperature at or below a value of approximately 350° C. to prevent crystallization. Thirdly, due to the rapid dispersion of heat from the ribbon surface into the ribbon body, the energy entering the ribbon 12 must enter very close to the point of convergence and the ribbon must also be moving at a rapid rate so that the molten surfaces can come into firm contact before resolidification.

As an example of the particular parameters involved, it is assumed that two iron-based glassy ribbons 14, 16 of 0.025 millimeter thickness each (such as 2605S Metglas ribbons, as manufactured by Allied Corporation of Morristown, N.J.) are being welded together. It is assumed that 0.00125 millimeters of the surface of each ribbon 14, 16 is melted (approximately 1/20 of the depth) and that the final ribbon temperature is under the crystallization temperature 350° C. Further, it is assumed that for simplification of the sample calculations only one laser beam 34' (1 cm wide) focuses upon the ribbons 14, 16 covering one section of welding operation illustrated in FIG. 2. The moving substrates or rollers 24, 26 forming the nip 22 are 10 centimeters in diameter.

The iron-based glassy ribbons selected for welding has a melt temperature of approximately 1250° C. and a heat capacity average of 0.17 cal/gm between 50° C. and 1250° C. with the heat capacity being equal to $0.11 + (1 \times 10^{-4} \times T°C.)$ as a function of temperature.

From the above it can be seen that if each ribbon is assumed to be initially at 50° C., then it requires approximately 37.5 cal/gm to heat the ribbon to 350° C. Since the surface of the ribbon is exposed to a high source of energy flux from the laser beam, the internal temperature of the ribbon drops off approximately linearly with distance from the surface. Thus, assuming the 0.025 millimeter thickness of ribbon as set forth above, 37.5 cal/gm absorbed at the surface raises the temperature of 0.00125 milliimeters of ribbon localized beneath the surface up to or above the melting point 1250° C. By the above approximation, the surface temperature is then calculated to be 1402° C. immediately after the energy pulse from the laser.

Iron-based glassy ribbons, such as 2605S Metglas, exhibit properties similar to the following that are assumed for purposes of further calculations.

Average heat capacity=0.17 cal/gm
Average density=7.76 gm/cm³
Average thermal conductivity=0.0411 cal/sec-cm-° C. 37.5 cal/gm=0.739 cal/cm² of ribbon surface (for a 0.025 millimeter thick ribbon)

A formula obtained from the *Handbook of Heat Transfer* by Rohsenow and Hartnet (1973) pages 3-82, gives the relationship between energy flux, time, and surface temperature as $$\frac{\sqrt{\pi pck}}{q \cdot \sqrt{D}} \cdot \Delta T = 2$$

where
p=density
c=heat capacity
k=thermal conductivity
q=heat flux per unit area
D=time duration of the pulse
ΔT=change in surface temperature Inserting the above assumed values for c and k, with ΔT equaling 1402° C.−50° C. as indicated above the result is 1

$$q \cdot \sqrt{D} = 279 \frac{cal}{cm^2 \cdot sec^{\frac{1}{2}}}$$

A second equation is obtained by recognizing that the total energy input is equal to q×D. From the properties assumed for this particular type of glassy ribbon, it is clear that q×D=0.739 cal/cm². Thus, there are two equations with two unknowns. In solving these two equations with two unknowns it is determined that the time duration D of the pulse is equal to $7 \times 10^{-6}$ sec and that the heat flux per unit area q is equal to $$1.05 \times 10^5 \frac{cal}{cm^2 \cdot sec}$$

Since the laser beam is focused into the nip between the converging and contacting ribbon surfaces, the beam converges along the line of convergence. In this manner the energy from the laser beam 34 impinges upon each ribbon 14, 16 in a very narrow rectangular area adjacent to the line of convergence. From geometrical considerations and the assumed shape of the laser beam, it may be shown that the width of the rectangular area in which the energy is being absorbed is given by $1.035 \times 10^{-3}$ multiplied by the diameter of the rollers 24, 26 in centimeters.

If the rectangular area of the ribbon 14, 16 is to move through the beam in $7 \times 10^6$ sec, as required by our previous calculations, then the rollers 24, 26 must be turning at the rate of 47 revolutions per second or 2826 RPM. This leads to the result that for a 10 cm diameter roller the ribbon speed should be 1479 cm/sec (or approximately 2,912 feet/minute) and the laser power should be approximately 9.15 kilowatts/cm of ribbon width.

As previously indicated for purposes of simplification, it was assumed that a single laser beam 34' is focused continuously along a single section of the line of convergence of the ribbons 14, 16. It, however, should be recognized that several beams, each having its beam 34' extending over a section of the width provides the preferred embodiment structure for fabricating a reasonably wide monolithic ribbon 12, as shown in FIG. 2. The weldment W is continuous and substantially uniform across the width of the ribbon 12 (see FIG. 3).

In the alternative embodiment, several narrower beams projected to be 1-3 millimeters wide may be focused at spaced intervals along the line of convergence between the ribbons 14, 16. The focal points are separated by enough distance, for example, 5 millimeters center-to-center spacing, providing a higher radiation flux entering the ribbon at each of these focal points so as to form spaced strip weldments W' forming a composite ribbon 12' (see FIG. 4). With areas left free of weldment, more of the ribbon 12' is left to provide for the heat sink function to properly cool the ribbon, and thus prevent recrystalization. Higher welding energy can in turn be applied to the ribbon speed or drawing rate can be decreased, thereby making it easier to control the welding process. Furthermore, this strip welding concept could be further expanded whereby the laser energy source is periodically interrupted to provide longitudinal, as well as lateral spacing between the weldments W' allowing further speed reduction. This strip/spot welding is otherwise carried out under the same method parameters as with the continuous welding described in the preferred embodiment. It is contemplated that less stress is imparted to the finished ribbon 12' with the reduced welding, thereby allowing greater ease in winding the ribbon into a toroid to form a transformer.

In summary, numerous benefits have been described which result from employing the concepts of the present invention. The present method recognizes the particular properties of amorphous or glassy material and utilizes particular operational parameters of laser beam power, drawing rate and cooling rate to weld two glassy metallic ribbons into a thick monolithic glassy metallic ribbon or body. More specifically, the preferred method is designed to have the ribbons to be self quenching and retained at an overall temperature below 350° C. The rectangular energy beam of about 1 cm. in width is focused into the nip where approximately 1/20 of the depth (0.00125 millimeter) of the 0.025 millimeter thick ribbons is melted. The speed of ribbon movement is controlled at 1479 cm/sec to allow $7 \times 10^{-6}$ seconds exposure at a power of 9.15 kw/cm. of ribbon width. In an alternative embodiment, strip/spot welding is provided for better control and for a finished ribbon with less stress.

The method allows the fabrication of a glassy product ribbon having a thickness greater than can presently be produced through the casting process, as the casting process is limited by the chill rate necessary to obtain the amorphous molecular structure. Advantageously, the thick product ribbon of the present invention may be utilized to manufacture, for example, transformer cores with increased magnetic flux, thereby providing improved efficiency.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method for the substantially continuous welding of at least two amorphous or glassy metallic ribbons into a composite glassy metallic body, comprising:
   drawing the ribbons in converting fashion into firm contact with each other at a nip between two moving substrates;
   projecting and focusing a high intensity source of energy substantially at the centerline of the nip between the converging and contacting ribbon surfaces;
   melting a weldment on each of the converging and contacting ribbon surfaces with the energy source while limiting the total energy absorbed by the ribbons, whereby the energy is distributed in the resulting composite body so as to be maintained at a temperature below the recrystallization temperature for the ribbon;
   compressing the ribbons at the nip between the substrates to form the ribbons into the composite amorphous body; and
   cooling said body internally at a rate sufficient to resolidify the weldment and retain the body including the weldment in an amorphous metallic state.

2. The method set forth in claim 1, including the additional step of generating said high intensity source of energy with at least one laser beam.

3. The method set forth in claim 2, including the additional step of focusing a plurality of laser beams at spaced intervals forming a narrow continuous beam along the nip between the converging and contacting ribbon surfaces, said beam being approximately 1 cm. wide at the nip.

4. The method set forth in claim 1 wherein said drawing of the ribbons is at a rate of approximately 1,479 cm/sec.

5. The method set forth in claim 1, wherein said step of projecting energy is at the rate of approximately 9.15 kilowatts/centimeter of ribbon width.

6. The method set forth in claim 1, wherein said step of projecting heat provides an exposure of approximately $7 \times 10^{-6}$ seconds.

7. The method set forth in claim 6, wherein said step of projecting heat sufficient to melt approximately 1/20 of the depth of each ribbon.

8. The method set forth in claim 7, wherein said step of projecting heat is sufficient to melt approximately 0.00125 millimeter of the depth of each ribbon having a 0.025 millimeter thickness.

9. The method set forth in claim 1, wherein said cooling rate is at least $10^{5}$° C./second.

10. A thick, amorphous metallic ribbon produced from the welding of at least two or more amorphous metallic ribbons, as set forth in claim 1.

* * * * *